United States Patent [19]

Supcoe et al.

[11] 4,293,339
[45] Oct. 6, 1981

[54] UNDERWATER WAX FORMULATION AND METHOD

[75] Inventors: Robert F. Supcoe; Thomas Radakovich, both of Annapolis, Md.

[73] Assignee: The United States of America as represented by the Secretary of the Navy, Washington, D.C.

[21] Appl. No.: 125,733

[22] Filed: Feb. 28, 1980

[51] Int. Cl.$^3$ .......................... C09D 5/08; C09D 5/14
[52] U.S. Cl. .............................. 106/18.29; 106/18.35; 106/270; 427/429
[58] Field of Search ..................... 106/270, 271, 18.29, 106/18.35; 427/429

[56] References Cited

U.S. PATENT DOCUMENTS

| | | | |
|---|---|---|---|
| 2,838,419 | 6/1958 | Francis | 106/14.36 |
| 3,806,352 | 4/1974 | Kirksaeter et al. | 427/154 |
| 3,959,530 | 5/1976 | Kaliardos | 427/154 |
| 4,019,922 | 4/1977 | Whittum et al. | 106/272 |
| 4,020,200 | 4/1977 | Groszek et al. | 427/416 |
| 4,098,925 | 7/1978 | Rasmussen | 427/154 |
| 4,115,130 | 9/1978 | Crump et al. | 106/16 |
| 4,154,818 | 5/1979 | Kanada et al. | 106/15.05 |
| 4,183,757 | 1/1980 | Groszek et al. | 106/18.29 |

*Primary Examiner*—Lorenzo B. Hayes
*Attorney, Agent, or Firm*—R. S. Sciascia; L. A. Marsh; W. W. Randolph

[57] ABSTRACT

A wax coating composition capable of underwater application to submerged surfaces comprises a mixture of from about 2% to about 18% of a polymer having the recurring unit -$C_2F_3Cl$-; from about 20% to about 40% of a microcrystalline wax; from about 40% to about 70% of a chlorinated paraffinic hydrocarbon and up to about 5% of a surfactant. An appropriate biocide may be interspersed into the wax to prevent marine growth.

Another wax coating composition comprises a mixture of from about 16% to about 27% of a paraffin wax; from about 22% to about 33% of a microcrystalline wax; and from about 36% to about 58% of a chlorinated paraffinic hydrocarbon. A biocide such as the organotins or cuprous oxide antifoulants may comprise from about 2% to about 10% of the wax mixture.

4 Claims, No Drawings

UNDERWATER WAX FORMULATION AND METHOD

The invention described herein may be manufactured and used by or for the Government of the United States of America for governmental purposes without the payment of any royalties thereon or therefor.

BACKGROUND OF THE INVENTION

This invention generally relates to coating materials and more particularly to an improved wax formulation suitable for application to the submerged surfaces of ships and capable of being applied underwater.

Although various antifouling paints and related compositions have been developed to prevent marine organisms from fouling the bottoms of ships while at sea, a greater degree of marine growth and fouling of ship bottoms is often experienced while the ships are in port. Accordingly, temporary antifouling formulations, such as wax coating materials, have been developed to provide additional protection while the ships are in port. Prior wax-based formulations are generally exemplified by U.S. Pat. Nos. 2,838,419; 3,806,352; 3,959,530; 4,020,200; 4,098,925; 4,115,130; and 4,154,818. However, many antifouling wax formulations have the common drawback of being difficult to apply underwater to submerged surfaces.

SUMMARY OF THE INVENTION

The present invention overcomes application problems experienced with the prior art by providing a durable wax formulation capable of being applied to the submerged surfaces of ships wherein, for example, the seawater temperature may be from about 45° F. to about 80° F. Since physical properties, such as hardness, viscosity and plasticity, of the wax are affected by the surrounding environment, it is critical that the wax formulation is capable of easy application under existing temperature conditions. The wax formulation should also be capable of displacing the water molecules from the surface of the ship yet remain insoluble in seawater and sufficiently hard so that a durable coating is provided. Another requirement satisfied by the present wax formulation is that it provides good adhesion qualities with a ship surface while precluding the attachment of various marine organisms thereto. A further requirement for the wax formulation is that, for antifouling purposes, the wax is capable of accepting a variety of antifoulants and biocides without adversely reacting therewith. The above criteria were met by providing wax formulations which include predetermined amounts of paraffin and microcrystalline waxes, halogenated saturated aliphatic waxes, surfactants, and antifoulants. Such formulations should have a density of from about 0.734 to about 0.885 g/cm$^3$; a viscosity at 100° C. of from about 6.7 to about 7.4 cps; a melting point range of from about 41° C. to about 52° C.; and an ASTM penetration at 77° F. of about 25 to facilitate easy application to submerged surfaces.

Thus, one object of the present invention is to provide a method for coating an underwater surface with a wax formulation which contains a biocidal composition effective against weed and/or shell growth.

Another object of this invention is the provision of a protective wax coating for ship bottoms which exhibits good spreadability and easy application over a variety of conditions.

A further object of the present invention is to provide a durable protective coating for preventing marine growth and corrosion of ship bottoms while in port.

DESCRIPTION OF THE PREFERRED EMBODIMENT

The waxes which are used in the present formulations are generally characterized as being derivatives of petroleum. In broad terms, petroleum is characterized by the following types of hydrocarbons: paraffins, olefins, napthenes and aromatics. Paraffins are saturated, aliphatic (open-chain) hydrocarbons where the carbon atoms are linked together with single bonds. Distinct from the saturated open-chain hydrocarbons, olefins are unsaturated open-chain hydrocarbons since they are characterized by double and triple bonds between carbon atoms. Naphthenes are saturated hydrocarbons containing one or more ring structures and aromatic hydrocarbons are characterized by the presence of benzene rings. By appropriate distillation and separation techniques, the petroleum can be separated into these types of hydrocarbons in the form of various waxes, oils, solvents and residues.

The saturated aliphatic waxes may be characterized by their melting points and the processes by which they are derived and separated. For example, waxes derived from the wax-distillate fraction of crude petroleum and commonly referred to as paraffin waxes have molecules with average molecular weights of from about 260 to about 460 and have melting points which are usually between 120° F. and about 140° F. Higher melting point waxes, which are sold as microcrystalline, amorphous and heavy petroleum waxes, are usually derived from the heavy lubricating-oil fractions of the petroleum distillate. The microcrystalline waxes have molecules with average molecular weights of from about 400 to about 700 with from about 40 to 50 carbon atoms and melting points which are normally above 150° F.

As opposed to the low melting point paraffin waxes which tend to be somewhat brittle, microcrystalline waxes are tough and resist fracture. Addition of oil to the wax will tend to increase its plasticity. Microcrystalline waxes are generally compatible with other mineral and vegetable waxes and various resins. Thus, they are especially useful for increasing the hardness and melting point and for decreasing tack, sweating and other undesirable qualities of wax blends. For example, although paraffin waxes have serious shortcomings due to their high crystallinity and to the low intercrystalline forces bonding one crystal to another, the addition of microcrystalline waxes provides a means of modifying the functional properties of paraffin waxes by controlling the crystal size, the amount of amorphous intercrystalline material, the molecular weight and the transition point of the wax. Thus, the microcrystalline waxes as used in the present wax formulation serve a variety of functions, such as providing hardness and stability to the wax coating as well as intermixing with a variety of other materials.

| PHYSICAL CHARACTERISTICS OF SOME MICROCRYSTALLINE WAXES | | | | |
|---|---|---|---|---|
| | | Brands | | |
| Properties | Quaker State Microwax | Barnsdall Special Wax | Socony No 2300 | Syncera Wax |
| Melting Point (°F.) | 145–146 | 160–165 | 155 | 155–160 |

-continued

PHYSICAL CHARACTERISTICS OF SOME MICROCRYSTALLINE WAXES

| Properties | Quaker State Microwax | Brands Barnsdall Special Wax | Socony No 2300 | Syncera Wax |
|---|---|---|---|---|
| Specific Gravity (60° F.) | 0.90–0.92 | 0.92–0.94 | — | 0.912 |
| Specific Gravity (210° F.) | 0.78–0.80 | 0.80–0.82 | — | — |
| Viscosity at 210° F. (Saybolt) | 75–85 | 75–100 | 65 | 51 |
| Flash Point (°F.) | 500 min. | 500 min. | 495 | 425 |
| Fire Point (°F.) | 575 min. | 575 min. | 550 | — |
| Acid Number | 0.1 max | 0.1–0.2 | — | 0 |

Other constituents of the antifouling wax formulation are halogenated aliphatic waxes such as chlorowaxes and fluorowaxes or fluorolubes. The use of the halogenated waxes appears to modify the other paraffin and microcrystalline waxes so that the resulting matrix has an affinity for immersed application to underwater surfaces.

Fluorowaxes, hereinafter referred to as fluorolubes, are linear polymers built up of a recurring unit which is:

The terminal groups on each end of a chain are derived from the polymerization catalyst and/or the solvent. The fluorolubes, which are essentially fluorinated-chlorinated long chain saturated aliphatics, are stabilized by subjecting them to rigorous fluorination conditions wherein the terminal groups are fluorinated and any loosely held chlorine is replaced by fluorine. Although the fluorolubes are normally produced in an oil state, they can be prepared as greases in the form of silica-gel thickened oils. In general, fluorolubes are thermally stable up to about 260° C. and at about 300° C. depolymerization occurs. They are relatively insoluble in water, mineral acids and aqueous alkali solutions; slightly soluble in the lower alcohols; and generally soluble in petroleum base oils, benzene, ketones and most chlorinated materials. The high solubility with halogenated materials makes them especially useful as plasticizers for such compounds.

Properties of fluorolubes manufactured by the Process Chemicals Division, Hooker Chemicals and Plastics Corporation, Niagara Falls, N.Y. are as follows:

| Grade | FS-5 | MO-10 | S-30 | T-80 | HO-125 |
|---|---|---|---|---|---|
| A. OILS | | | | | |
| Viscosity, cp | | | | | |
| at 100° F. | 11 | 31 | 190 | 970 | 1460 |
| at 160° F. | 4.5 | 9 | 30 | 77 | 115 |
| Viscosity, cs | | | | | |
| at 100° F. | 6 | 16 | 100 | 500 | 750 |
| at 160° F. | 2.5 | 5 | 15 | 41 | 60 |
| Density (gm/cc) | | | | | |
| 100° F. | 1.868 | 1.895 | 1.927 | 1.945 | 1.953 |
| 160° F. | 1.812 | 1.840 | 1.876 | 1.893 | 1.902 |
| Pour Point (°F.) | −60 | −50 | 12 | 50 | 60 |

The fluorolube oils made by Hooker Chemicals and Plastics have an average molecular weight range of from about 500 to about 950.

| | B. GREASES | | | |
|---|---|---|---|---|
| | mm Penetration (ASTM D-217-48) | | | Dropping Point |
| | 77° F. | 100° F. | 125° F. | (ASTM D-2265) |
| GR-290 | 239 | 250 | 270 | >450° F. |
| GR-362 | 263 | 269 | 273 | >450° F. |
| GR-470 | 183 | 185 | 190 | >450° F. |
| GR-544 | 267 | 285 | 300 | >450° F. |
| Shear Stability (at 77° F.) Worked Penetration in mm | | | | |
| | 60 strokes | 500 strokes | 1000 strokes | |
| GR-290 | 245 | 252 | 255 | |
| GR-362 | 267 | 256 | 263 | |
| GR-470 | 178 | 180 | 181 | |
| GR-544 | 258 | 265 | 267 | |

The fluorogreases made by Hooker Chemicals and Plastics have an average molecular weight of from about 600 to about 1200.

Chlorinated waxes, hereinafter referred to as chlorowaxes, may be described as chlorinated aliphatic saturated hydrocarbons which include molecules having from 10 to 30 carbon atoms. The properties of a particular commercial chlorowax depend on the following factors: (a) the nature of the raw material; (b) the chlorine content; and (c) the conditions of manufacture, such as the temperature of chlorination. Chlorowaxes are generally produced by passing gaseous chlorine into a paraffinic hydrocarbon at a temperature at which the viscosity of the paraffin is sufficiently low to permit free evolution of hydrogen chloride and solution of the chlorine. Although catalysts are not generally used, some production processes employ a solvents such as carbon tetrachloride and hexachlorobutadiene. The chlorine content will normally range from 40% to 70% although chlorowaxes designed for particular purposes have been prepared in which the chlorine contents were less than 40% and, conversely, greater than 70%. Chlorowaxes are insoluble in water and the lower alcohols but readily form emulsions with water in the presence of a suitable emulsifying agent. Chlorowaxes with chlorine contents greater than about 40% are soluble in mineral and lubricating oils, benzene, chlorinated solvents, ether, ketones, and esters. The commercially marketed chlorowaxes are usually designated by a trade name, followed by a number indicating the chlorine content, eg. Chlorowax (trademark of Diamond Shamrock Co.) 40, Cereclor (trademark of Imperial Chemical Industries, Ltd.) 70.

To improve the displacement of the water molecules and promote further adhesion of the wax material with the substrate, anionic surfactants may also be used. Examples of surfactants include naturally derived soaps, synthetic alkyl benzene sulfonates, and sulfonated fatty alcohols. However, although thousands of surfactants are presently being used to wet, foam, penetrate, emulsify, solubilize and/or disperse a selected material, there does not appear to be a universal surfactant. For example, Sarkosyl surfactants, as made by CIBA-GEIGY find particular application in the present wax formulation and they are made by reacting sarcosine, an N-methyl derivative of glycine ($NH_2CH_2COOH$, an amino acid), with fatty acid chlorides to yield a polar molecule in which the C-N-C amide linkage is interposed between the hydrophobic hydrocarbon chain and the hydrophilic carboxy group. This interposition of the amide bond is a characteristic of the Sarkosyl family and makes them very stable to acids and alkalies. They are also highly resistant to water hardness and metallic salts, biologically safe, and intermix well with the paraffin and refined waxes as well as with the halogenated waxes.

To the above mixtures of paraffin and refined waxes, halogenated waxes, and surfactants are added compatible amounts of antifoulants and biocides. A wide variety of biocides, as for example those disclosed in U.S. Pat. No. 4,020,200, are compatible with the abovementioned constituents. Biocidal compounds which can also be added to the wax mixture and are effective against marine growth include metal compounds, such as those containing tin, copper, zinc, nickel, cobalt, manganese or mercury, and organic compounds having an active structure containing sulfur, chlorine, nitrogen and oxygen atoms. Among the most effective biocidal compounds for preventing marine growth on underwater surfaces are copper compounds, such as cuprous oxide, and the organo-tin compounds.

The invention is further illustrated by the following examples.

EXAMPLE 1

One wax formulation capable of underwater application comprises, by weight, from about 2% to about 18% of a fluorolube; from about 20% to about 40% of a microcrystalline wax; from about 40% to about 70% of a chlorowax (chlorinated saturated aliphatic hydrocarbon); and up to about 5% of a surfactant. Depending on the particular type and concentration of marine organisms in the seawater, different biocides may be added to the formulation.

A particular wax mixture found to provide a good protective coating comprises, by weight percent, about 10% of Fluorolube GR 470; about 30% of a microcrystalline wax, Duroxon J-324; about 67% of Chlorowax 500C; and about 3% of a surfactant, Sarkosyl O. A biocide, Nopcocide N-96, may be added up to about 5% of the abovementioned mixture.

Fluorolube GR-470, as made by Hooker Chemicals and Plastics, Niagara Falls, N.Y. has the following properties:

(a) Penetration (ASTM D-217-48) mm. penetration

| 77° F. | 100° F. | 125° F. |
|---|---|---|
| 183 | 185 | 190 |

(b) Shear Stability (at 77° F.) worked penetration in mm.

| 60 strokes | 500 strokes | 100 strokes |
|---|---|---|
| 178 | 180 | 181 |

(c) Dropping Point (ASTM D-2265) above 450° F.

Duroxon J-324, as manufactured by Krupp Kohlechemie GMBH, is a multi-purpose emulsifiable microcrystalline wax derived from the Fischer-Tropsch process. The wax is characterized as being high melting; relatively hard and dry to the touch; having high emulsifiability with anionic or nonionic systems; and having a high solvent binding capacity. The wax also has the following properties: a melting point (ASTM D-127) of 108° C., a congealing point (ASTM D-938) of 88° C. to 90° C., a penetration (ASTM D-1321) of 1 to 2 mm; a fire point of 330° C.; and a saponification value of 20 to 30.

Chlorowax 500C, as manufactured by Diamond Shamrock, is a relatively short chain, highly chlorinated (about 59% by weight), saturated aliphatic hydrocarbon.

Sarkosyl O, which has the formula $CH_3(CH_2)_{17}CON(CH_3)CH_2COOH$ and is made by CIBA-GEIGY, is an oleyl sarcosine which is capable of acting as an anti-corrosive agent, a detergent and an emulsifier.

Nopcocide N-96, which is made by Diamond Shamrock, has an empirical formula $C_8Cl_4N_2$ and has a benzene structure with a molecular weight of 265. Having a chemical name 2,4,5,6-Tetrachloroisophthalonitrile, Nopcocide N-96 has a melting point of about 250° C., a boiling point of about 350° C. and a specific gravity of 1.8. It is noncorrosive and is thermally stable under normal storage temperatures.

EXAMPLE 2

Another wax formulation found to provide a good protective coating comprises, by weight percent, from about 16% to about 27% of a paraffin wax; from about 22% to about 33% of a microcrystalline wax; from about 36% to about 58% of a chlorowax (a chlorinated saturated aliphatic hydrocarbon); and from 2% to about 10% of a biocide.

A specific wax mixture providing good underwater application comprises about 28% of a microcrystalline wax, Indramic 30; about 21% of a paraffin wax; about 28% of Chlorowax 70L; about 20% of Chlorowax 500C and about 3% of Nopcocide N-96.

The INDRA Micro Waxes, as manufactured by Industrial Raw Materials Corp., New York City, N.Y., are highly refined microcrystalline waxes of high melting point and minute needle-like microcrystals. They consist predominately of long branched-chain saturated hydrocarbons wherein their molecular weights range from approximately 580 to 700 with about 41 to 50 carbon atoms. These waxes are insoluble in water; slightly soluble in alcohol; and freely soluble in chloroform, ether, benzene, and many oils. The INDRA Micro Waxes are extremely tough yet exhibit a high degree of plasticity and their good adhesive properties and water repellancy make them good coating materials. The Indramic 30 waxes have a melting point range of from 165° F. to about 175° F. and a penetration (ASTM D5-25) of from 25 to 35.

Paraffin waxes are generally characterized as comprising saturated aliphatic hydrocarbons having from about 18 to about 34 carbon atoms and solidifying between 80° F. and 156° F. As previously mentioned, the paraffin waxes tend to be brittle and inflexible, as compared with microcrystalline waxes. However, they blend well with microcrystalline waxes to produce a wax which incorporates the better features of both waxes.

Chlorowax 500C a highly chlorinated short chain hydrocarbon, and Chlorowax 70L, a less chlorinated longer chain hydrocarbon, are generally described as halogenated, saturated aliphatic hydrocarbons and are manufactured by Diamond Shamrock. Chlorowax 500C has a molecular weight of about 415; a viscosity at 25° C. (Brookfield Viscometer) of 20 poises; a specific gravity at 25° C. of 1.35; a chlorine content of 59%; and a surface tension at 25° C. of 40 dynes/cm. Chlorowax 70L has a viscosity at 25° C. (Brookfield Viscometer) of 10,000 poises, a saybolt universal viscosity at 210° F. of 400, a specific gravity at 25° C. of 1.55 and a chlorine content of 69%. Chlorowax 70 has an average molecular formula of $C_{23}H_{26}Cl_{22}$. The Diamond Shamrock Chlorowaxes are generally prepared by chlorinating paraffin waxes which have an average molecule containing about 20 to 23 carbon atoms.

Preferably, to allow easy application, the wax formulations of the abovementioned materials should have the following properties: a density of from about 0.734 to about 0.885 g/cm$^3$; a viscosity at 100° C. of 6.7 to 7.4 cps; a melting point of about 41° C. to about 52° C.; and an ASTM penetration at 77° C. of 25 mm. Thus, the wax formulations desired are medium to semi-hard creams which are easily moldable pastes at ambient temperatures. It is further observed that formulations of the above materials have a characteristic property of displacing water from an immersed surface and possess adhesive qualities to readily attach thereto. Also, the formulations have a "tackiness" which allows the wax to be "picked up" with a wet brush, sponge, cloth or other applicator. Methods and means of applying the wax coating underwater to ship surfaces include brushing the wax onto the underwater surface with a brush or mechanical applicator, wiping the wax onto the ship surface with a sponge or cloth, and rolling the wax onto the submerged surfaces with a paint roller.

Obviously many modifications and variations of this invention are possible in light of the above teachings. It is therefore to be understood that within the scope of the appended claims the invention may be practiced otherwise than as specifically described.

What is claimed is:

1. A wax coating material for application to submerged surfaces consisting essentially of a mixture, by weight percent, of from about 2% to about 18% of a fluorinatedchlorinated aliphatic polymer having a recurring unit of —$C_2F_3Cl$— and an average molecular weight range of between about 500 to about 1200;

from about 20% to about 40% of a microcrystalline wax;

from about 40% to about 70% of a chlorinated paraffinic hydrocarbon having a chlorine content, by weight percent, of from about 40% to about 70% and up to about 5% of a surfactant for improving the displacement of the water molecules from the surface.

2. The wax material according to claim 1, further comprising a biocide for preventing marine growth comprising, by weight percent, from about 1% to about 10% of the wax mixture.

3. The wax material of claim 1, wherein said mixture has a viscosity of 100° C. of 6.7 to 7.4 cps;

a melting point of about 41° C. to about 52° C. and a density of about 0.734 g/cm$^3$ to about 0.885 g/cm$^3$.

4. A method of coating submerged surfaces for preventing marine growth comprises applying a wax mixture directly to the submerged surfaces, said wax mixture having a formulation substantially as follows:

from about 2% to about 18% of a fluorinated-chlorinated aliphatic polymer having a recurring structural unit —$C_2F_3Cl$— and an average molecular weight range of between about 500 to about 1200;

from about 20% to about 40% of a microcrystalline wax;

from about 40% to about 70% of a chlorinated paraffinic hydrocarbon having a chlorine content, by weight percent, of from about 40% to about 70%; and up to about 5% of a surfactant for improving the displacement of the molecules from the surface.

* * * * *